(12) United States Patent
Shearer et al.

(10) Patent No.: US 7,546,401 B2
(45) Date of Patent: Jun. 9, 2009

(54) BYTE TO BYTE ALIGNMENT OF MULTI-PATH DATA

(75) Inventors: Robert A. Shearer, Rochester, MN (US); Craig A. Wigglesworth, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 10/948,777

(22) Filed: Sep. 23, 2004

(65) Prior Publication Data

US 2006/0072625 A1    Apr. 6, 2006

(51) Int. Cl.
*G06F 13/12*    (2006.01)
*G06F 3/00*    (2006.01)

(52) U.S. Cl. .............................. 710/65; 710/30; 710/33; 710/36

(58) Field of Classification Search ........................ None
See application file for complete search history.

(56) References Cited

U.S. PATENT DOCUMENTS

| 5,003,558 | A | | 3/1991 | Gregg |
| 5,253,254 | A | * | 10/1993 | Roberts et al. .............. 375/368 |
| 6,449,699 | B2 | | 9/2002 | Franke et al. |
| 6,820,143 | B2 | | 11/2004 | Day et al. |
| 6,820,174 | B2 | | 11/2004 | Vanderwiel |
| 2004/0117592 | A1 | | 6/2004 | Day et al. |
| 2004/0162946 | A1 | | 8/2004 | Day et al. |
| 2004/0263519 | A1 | | 12/2004 | Andrews et al. |

* cited by examiner

*Primary Examiner*—Alan S. Chen
(74) *Attorney, Agent, or Firm*—Patterson & Sheridan LLP (57) ABSTRACT

Methods and apparatus that may be utilized in an effort to ensure bytes of data sequentially received on multiple single-byte data paths with properly aligned when presented on a multi-byte interface are provided. A sufficient number of bytes received each channel may be stored (e.g., buffered) and examined to properly match data from each single-byte path. Once matched, the data may be output in a proper order on the multi-byte interface, for example, via some type of multiplexor arrangement.

21 Claims, 6 Drawing Sheets

| POSSIBLE ALIGNMENT/MISALIGNMENT OF START BITS | | |
|---|---|---|
| EVEN | ODD | DESCRIPTION |
| 1000 | 1000 | ODD AND EVEN ALIGNED |
| 1000 | X1000X | ODD LAGS EVEN BY 1, EVEN ALIGNED |
| 1000 | XX1000 | ODD LAGS EVEN BY 2, EVEN ALIGNED |
| 1000 | XXX100 | ODD LAGS EVEN BY 3, EVEN ALIGNED |
| X1000 | 1000 | ODD AND EVEN ALIGNED, BOTH SKEWED BY 1 |
| ... | ... | |
| XXX1 | XXX1 | ODD AND EVEN ALIGNED, BOTH SKEWED BY 3 |

| 8-BYTE ALIGNMENT MUX SETTINGS | |
|---|---|
| 8-BYTE DESCRIPTION | MUX SETTINGS |
| ONE 8-BYTE PACKET | COMPUTE MUX SETTINGS |
| START OF > 8 BYTE PACKET | COMPUTE MUX SETTINGS |
| END OF > 8 BYTE PACKET | USE PREV MUX SETTINGS |
| CONTINUATION OF > 16 BYTE PACKET | USE PREV MUX SETTINGS |

FIG. 5A

| 16-BYTE ALIGNMENT MUX SETTINGS | | |
|---|---|---|
| FIRST 8-BYTES | SECOND 8-BYTES | MUX SETTINGS |
| ONE 8-BYTE PACKET | ONE 8-BYTE PACKET | COMPUTE EACH SEPARATELY |
| ONE 8-BYTE PACKET | START OF A PACKET | COMPUTE EACH SEPARATELY |
| END OF A PACKET | ONE 8-BYTE PACKET | USE PREV FOR 1ST, COMPUTE 2ND |
| END OF A PACKET | START OF A PACKET | USE PREV FOR 1ST, COMPUTE 2ND |
| START OF A 16-BYTE PACKET | END OF A 16-BYTE PACKET | COMPUTE 1ST, USE PREV FOR 2ND |
| START OF A > 16-BYTE PACKET | CONTINUATION OF > 16-BYTE PACKET | COMPUTE 1ST, USE PREV FOR 2ND |
| CONTINUATION OF > 16 BYTE PACKET | CONTINUATION OR END OF > 16 BYTE PACKET | USE PREV FOR BOTH |

FIG. 5B

BYTE TO BYTE ALIGNMENT OF MULTI-PATH DATA

BACKGROUND OF THE INVENTION

1. Field of the Invention

The present invention generally relates to exchanging packets of data on a bus between two devices and, more particularly to dynamic reordering of data sequentially received on multiple single-byte input paths to ensure bytes of the data are properly aligned when presented on a multi-byte interface.

2. Description of the Related Art

A system on a chip (SOC) generally includes one or more integrated processor cores, some type of embedded memory, such as a cache shared between the processors cores, and peripheral interfaces, such as external bus interfaces, on a single chip to form a complete (or nearly complete) system. The external bus interface is often used to pass data in packets over an external bus between these systems and an external device, such as an external memory controller or graphics processing unit (GPU).

Oftentimes, the processor cores of a SOC may process data using multiple physically independent external data paths. These external data paths may be of different dimensions (e.g., a smaller byte size/bus width) than the internal bus utilized by the processor cores, with data on the multiple paths merged (or interleaved) onto the internal bus. Data transferred on these multiple paths can become out of alignment by the time they get to internal bus receivers due to different paths on a card containing the SOC and different analog clock-to-data alignment selection within the receivers.

Unfortunately, as the data transfer rate between devices increases with advancements in technology, this misalignment problem may be worsened, resulting in data carried on one path leading or lagging data on another path by one or more bytes. This misalignment can lead to incorrectly assembled data fed into the processor cores after the misaligned data on different paths is merged, which may have unpredictable results and possibly catastrophic effects.

Accordingly, what is needed are methods and apparatus for automatically aligning bytes of data received over multiple data paths.

SUMMARY OF THE INVENTION

The present invention generally provides methods and apparatus for automatically aligning bytes of data received over multiple data paths.

One embodiment provides a method of aligning data received on at least first and second single-byte data paths, the data to be presented on a multi-byte interface. The method generally includes storing multiple bytes of data sequentially received on the first and second data paths, examining the contents of the stored bytes of data to detect misalignment between bytes of data received on the first data path and bytes of data received on the second data path, and in response to detecting misalignment between the bytes of data received on a first and second data paths, generating a plurality of control signals to properly align the bytes of data received on the first and second data paths and present the aligned bytes of data in parallel on the multi-byte interface.

Another embodiment provides a packet aligner for use in aligning bytes of data received on at least first and second single-byte data paths, the bytes of data to be presented on a multi-byte interface. The packet aligner generally includes a first series of latches for storing multiple bytes of data sequentially received on the first data path, a second series of latches for storing multiple bytes of data sequentially received on the second data path, one or more multiplexors for receiving the contents of the latches and presenting a limited subset thereof on the multi-byte interface based on a plurality of control signals, and control circuitry. The control circuitry is generally configured to generate the plurality of control signals to properly align the bytes of data received on the first and second data paths based on the contents of the first and second series of latches.

Another embodiment provides a processor, generally including one or more processor cores, a shared buffer for holding data transferred from or to be transferred to the one or more processor cores, a processor bus coupling the one or more processor cores and the shared buffer pool, a physical interface for receiving data from a device external to the processor via an external bus, first and second single-byte data paths for providing data from the physical interface to the processor bus, and a packet aligner. The packet aligner is generally configured to detect misalignment between bytes of data received over the first and second data paths and generate one or more control signals to align the bytes of data received over the first and second data paths and present the aligned data on a multi-byte interface between the packet aligner and the processor bus.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention may be utilized in an effort to ensure bytes of data sequentially received on multiple single-byte data paths with properly aligned when presented on a multi-byte interface. A sufficient number of bytes received each channel may be stored (e.g., buffered) and examined to properly match data from each single-byte path. Once matched, the data may be output in a proper order on the multi-byte interface, for example, via some type of multiplexor arrangement. For some embodiments, alignment operations may be performed often (e.g., on a packet-by-packet basis) to compensate for various factors that may vary the skew between the multiple paths over time.

As used herein, the term data packet generally refers to any collection of data sent together, commonly between two devices and often with some type of header containing information about the data contained therein. While the size of a data packet may vary, it will typically (but not necessarily) be some multiple of N-bytes (e.g., 8-bytes, 16-bytes, etc., if N=8). As used herein, the term byte generally refers to some standard, fixed unit of data having a given number of bits (e.g., 8-bits, 16-bits, and the like), For convenience, but not for the purposes of limitation, the following description will refer to data packets that are multiples of 8 bytes, with each byte having 8-bits.

Further, in the following description, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

AN EXEMPLARY SYSTEM

Figure 1:
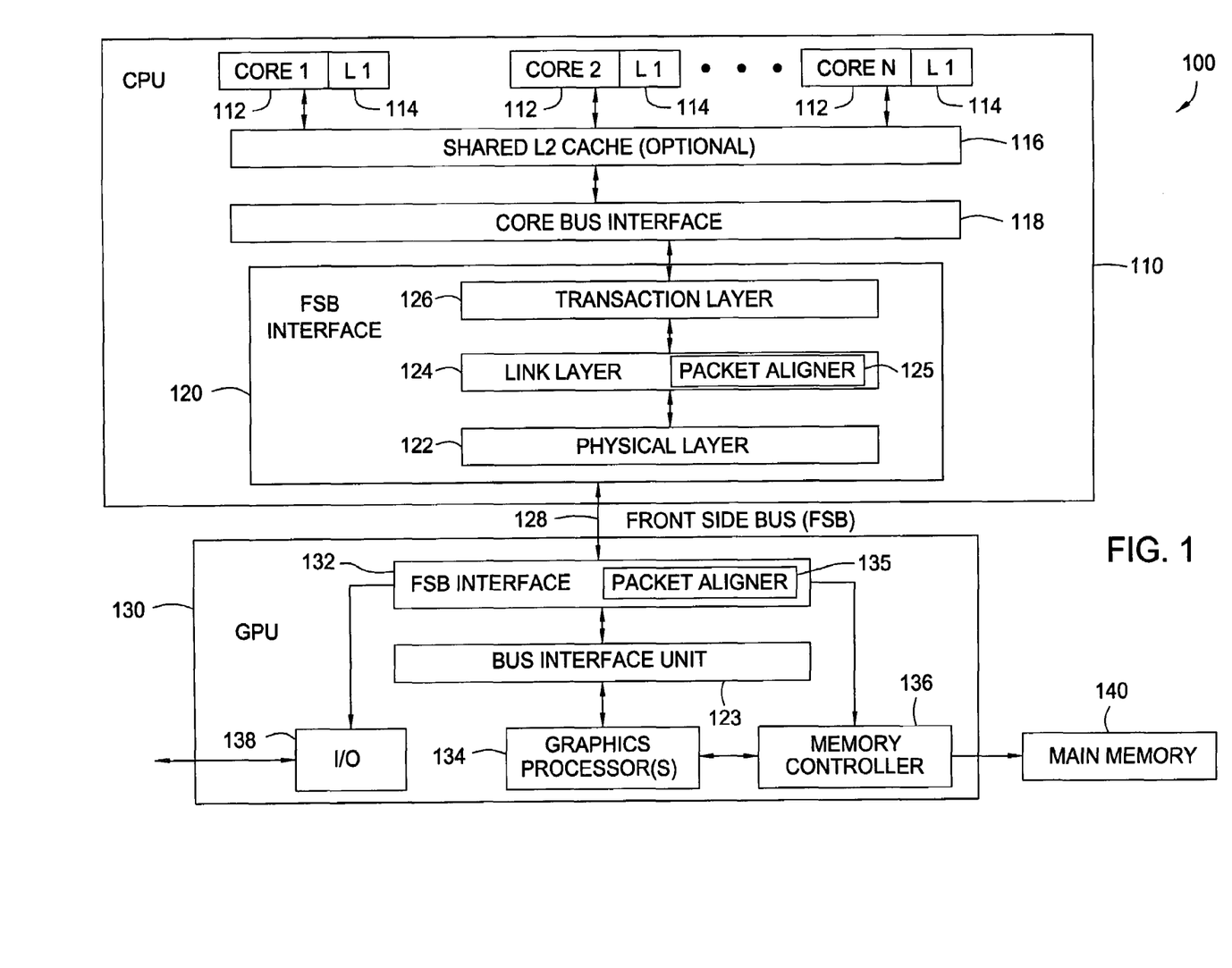
FIG. 1 illustrates an exemplary system including a central processing unit (CPU), in which embodiments of the present invention may be utilized.

FIG. 1 illustrates an exemplary computer system 100 including a central processing unit (CPU) 110, in which embodiments of the present invention may be utilized. As illustrated, the CPU 110 may include one or more processor cores 112, which may each include any number of different type function units including, but not limited to arithmetic logic units (ALUs), floating point units (FPUs), and single instruction multiple data (SIMD) units. Examples of CPUs utilizing multiple processor cores include the Power PC line of CPUs, available from International Business Machines (IBM).

As illustrated, each processor core 112 may have access to its own primary (L1) cache 114, as well as a larger shared secondary (L2) cache 116. In general, copies of data utilized by the processor cores 112 may be stored locally in the L2 cache 116, preventing or reducing the number of relatively slower accesses to external main memory 140. Similarly, data utilized often by a processor core may be stored in its L1 cache 114, preventing or reducing the number of relatively slower accesses to the L2 cache 116.

The CPU 110 may communicate with external devices, such as a graphics processing unit (GPU) 130 and/or a memory controller 136 via a system or frontside bus (FSB) 128. The CPU 110 may include an FSB interface 120 to pass data between the external devices and the processing cores 112 (through the L2 cache) via the FSB 128. An FSB interface 132 on the GPU 130 may have similar components as the FSB interface 120. The FSB interface 132 may be configured to exchange data with one or more graphics processors 134, input output (I/O) unit 138, and the memory controller 136 (illustratively shown as integrated with the GPU 130), via a bus interface unit (BIU) 123.

As illustrated, the FSB interface 120 may include a physical layer 122, link layer 124, and transaction layer 126. The physical layer 122 may include hardware components for implementing the hardware protocol necessary for receiving and sending data over the FSB 128. The physical layer 122 may exchange data with the link layer 124 which may format data received from or to be sent to the transaction layer 126. The transaction layer 126 may exchange data with the processor cores 112 via a core bus interface (CBI) 118.

For some embodiments, data may be sent over the FSB as packets. Therefore, the link layer 124 may contain circuitry (not shown) configured to encode into packets or "packetize" data received from the transaction layer 126 and to decode packets of data received from the physical layer 122. For some embodiments, data may be transmitted from the physical layer 122 to the link layer 124 via multiple single-byte data paths, for example, with one path used for transferring even bytes and another path for transferring odd bytes.

As previously described, bytes of data carried on the different internal paths may become skewed due to various factors, such as internal capacitance, different routing of the different internal paths, and the like. Some of these factors are generally static and contribute to a relatively static skew. However, other factors, such as thermal drift, tend to cause variance which may vary the skew over time. Further, various factors in the FSB interface 120, such as the clock timing of the interface used to pass data between some buffering mechanism in the physical layer 122 and the link layer 124 may result in skew between the multiple paths that varies over time.

BYTE TO BYTE ALIGNMENT

In order to compensate for (both static and dynamic) skew between the multiple paths, the link layer may include a packet aligner 125. Because the GPU 130 may utilize similar mechanism for data transfer, the GPU FSB interface 132 may also include a packet aligner 135 to compensate for skew on multiple single-byte data paths used therein.

Figure 2A:
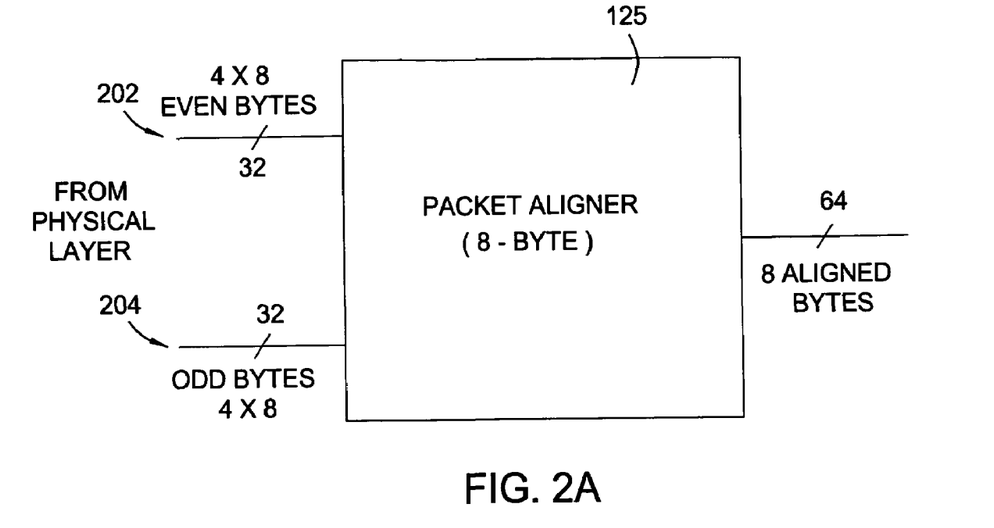
FIGS. 2A-2B are block diagrams of packet aligners, according to one embodiment of the present invention.

As illustrated in FIG. 2A, the packet aligner 125 may receive multiple (illustratively, 4) even and odd single-byte inputs on multiple byte interfaces 202 and 204, respectively. Components in the physical layer of the FSB interface may handle converting an incoming single byte data stream on the odd and even paths to the multiple byte interfaces 202 and 204 into the aligner. The packet aligner may then align the multiple bytes and output the multiple aligned bytes (illustratively 8 bytes) on a multi-byte interface (e.g., between the packet aligner and the core processor bus). For some embodiments, there may be a single flag bit for every byte of data, which may be used as a packet delimiter and must be aligned with the data.

Figure 2B:
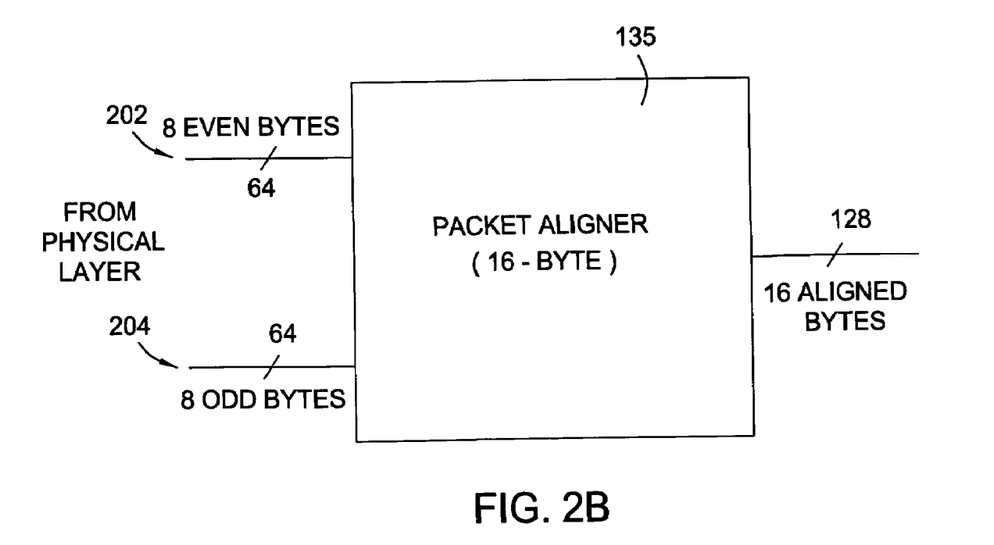

As illustrated in FIG. 2B, the GPU packet aligner 135 may perform similar operations, albeit with different data widths. For example, the GPU packet aligner 135 may receive multiple (illustratively, 8) even and odd single-byte inputs on multiple byte interfaces 206 and 208, respectively, and align the multiple bytes (illustratively, 16 bytes).

Figure 3A:
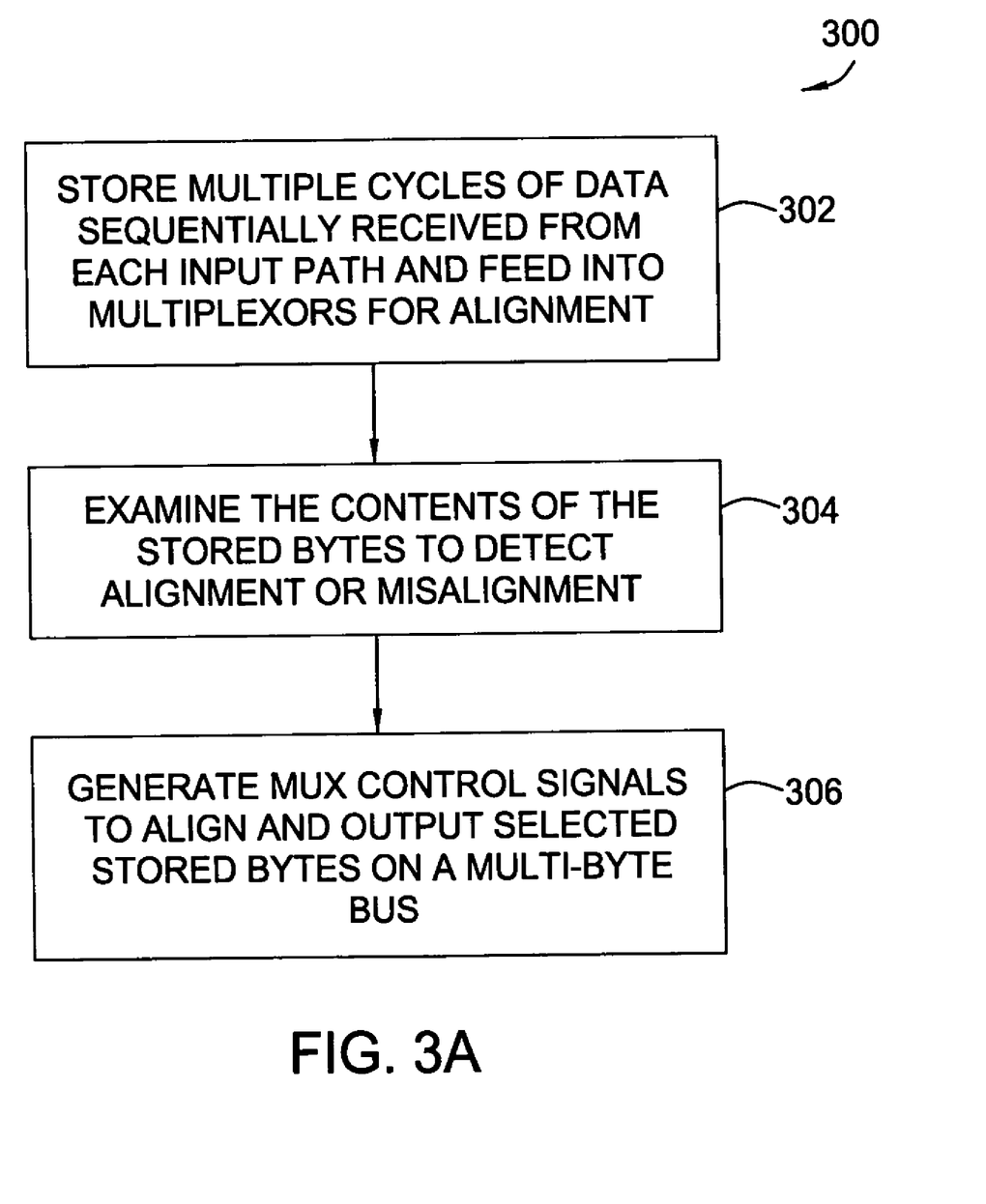
FIGS. 3A and 3B are a general flow diagram of exemplary operations for packet alignment and a table illustrating possible misalignments that may be corrected by the operations, respectively, according to one embodiment of the present invention.
Figure 3B:
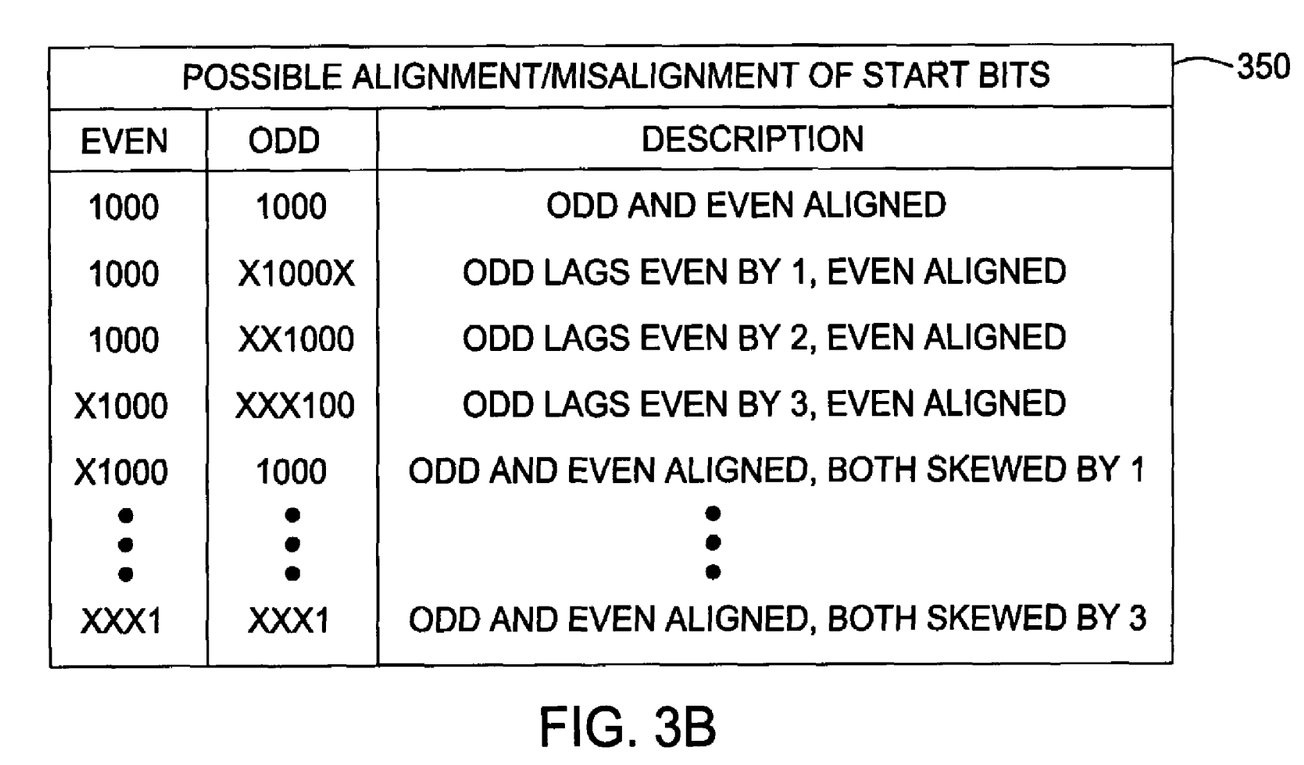

FIG. 3A illustrates exemplary operations 300 that may be performed (e.g., by packet aligners 125 and/or 135) to compensate for misalignment between multi-path data. FIG. 3B shows a table 350 listing some types of misalignment for which the operations 300 may be used to compensate. The operations 300 begin, at step 302, by storing multiple cycles of byte data received on multiple data paths, and feeding them into one or more multiplexor devices (muxes) for alignment. In other words, with each clock cycle, multiple bytes from each multi-byte interface 202 and 204 may be stored for alignment. At step 304, the contents of the stored bytes are examined to detect alignment or misalignment between the input paths. At step 306, mux control signals are generated to align and output multiple bytes in parallel, for example, on a single multi-byte interface.

As illustrated in FIG. 3B, the multiple (e.g., even and odd) data paths may both be aligned, misaligned with respect to each other, aligned with respect to each other but skewed with respect to the multi-byte interface, or both misaligned with respect to each and skewed with respect to the multi-byte interface. To compensate for misalignment of one data path with respect to the other, the data path that is leading the other by a number of clock cycles may be, in effect, delayed by that same number of cycles, allowing the lagging data path to catch up. To compensate for misalignment of both data paths with respect to the multi-byte interface, data on both paths may be controlled and output in synch with some clock signal. To compensate for misalignment of both data paths with respect to the multi-byte interface, as well as misalignment between the data paths, data on the leading path may be delayed, while data on both paths may be controlled and output in synch with some clock signal.

Figure 4:
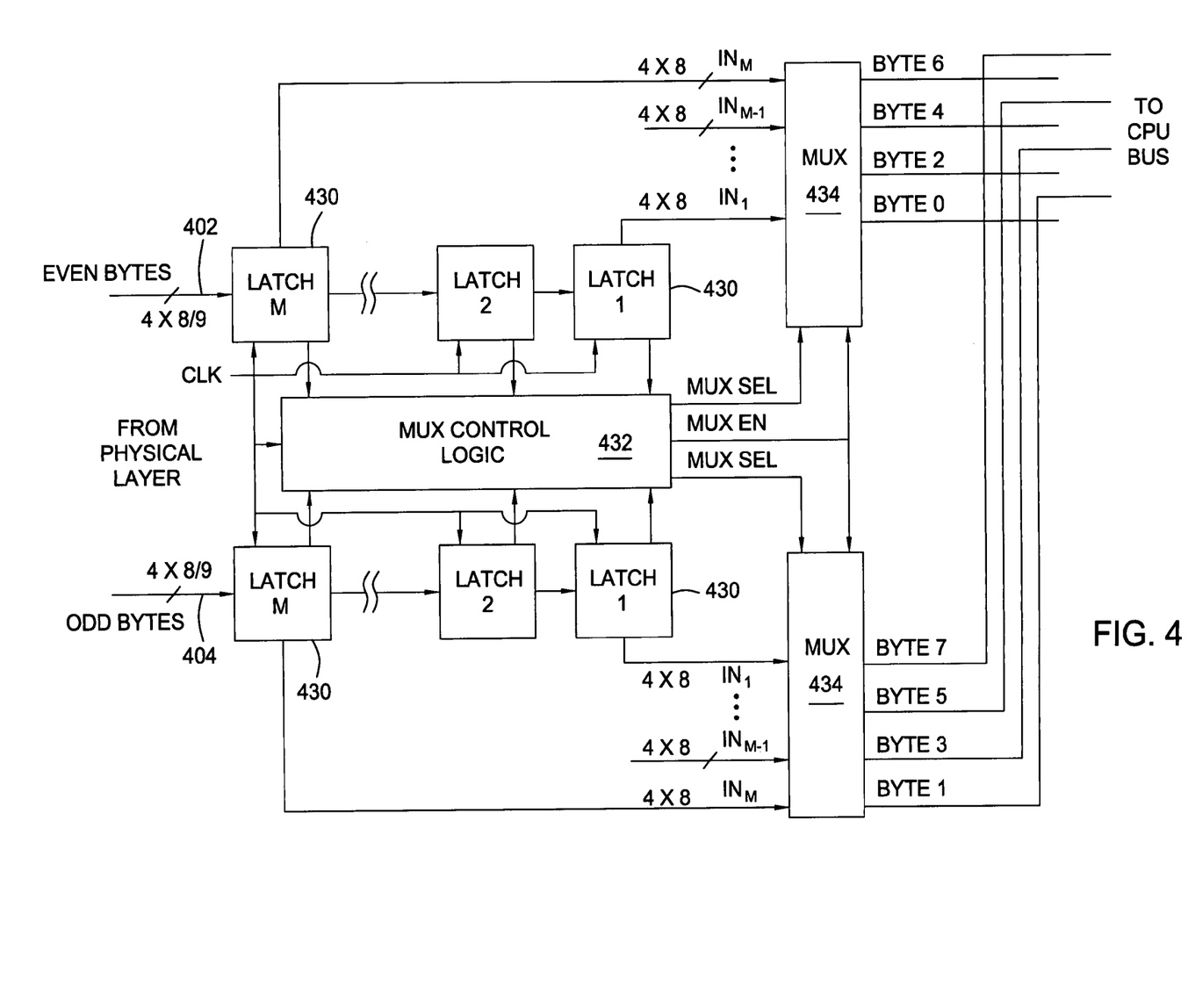
FIG. 4 is an exemplary circuit diagram of a packet aligner according to one embodiment of the present invention.

FIG. 4 is an exemplary circuit diagram of a packet aligner 425, according to one embodiment of the present invention, that may be used to carry out the operations 300. As illustrated, the packet aligner 425 may include a series of latches 430 (illustratively M) to receive and store bytes of data input from each input path 402-404 (e.g., with 4 bytes stored in each latch 430). The contents of the even and odd latches 430 are both fed into mux control logic 432 and separately fed into multiplexor devices (muxes) 434. While two muxes are shown, one skilled in the art will recognize that similar functionality may also be achieved in a single device. In any case, the mux control logic 432 is generally configured t of the bytes stored in both the even and odd latches 430 in order to determine misalignment and, based on this examination, generate control signals to the multiplexors 434 to output properly aligned even and odd bytes. In other words, each multiplexor 434 may be generally configured to output four successive (even or odd) bytes of data stored in the latches 430, with the exact four bytes output by each multiplexor 434 dependent on the mux control signals generated by mux control logic 432.

For some embodiments, the mux control logic 432 may determine misalignment between even and odd bytes by detecting some type of predefined code, such as a byte code indicative of start bytes. For such embodiments, the odd and even pair of bytes at the beginning of each packet may have some type of predetermined code, such as all ones, or some other type of pattern indicating start bytes. For other embodiments, some type of flag, such as an extra start bit appended to each byte may be used to indicate start bytes. In any case, by identifying start bytes in each input path 402-404, the mux control logic 432 can determine if the data in the paths 402-404 is properly aligned and, if not, may effectively delay the output of data from (a leading) one of the data paths or both paths to compensate.

As an example, the mux control logic 432 may detect an even start byte in the first latch (latch 1) in the even path 402 and an odd start byte in the second latch (latch 2) in the odd path 404, indicating odd data lags the even data by one clock cycle. In order to properly align the data at the output, the mux control logic may generate a first set of mux control signals to cause the contents of even latches 1-4 to be output from the even mux 434 (bytes 0, 2, 4, and 6), while generating a second set of mux control signals to cause the contents of the odd latches 2-5 to be output from the odd mux 434 (bytes 1, 3, 5, and 7).

For some embodiments, in an effort to improve performance, the mux control logic 432 may be configured to output aligned data from the muxes 434 at the earliest possible point in time. Depending on alignment of the even and odd data, however, the mux control logic 432 may have to delay one or more clock cycles after determining the alignment of the data before outputting the data. For example, the mux control logic 432 may detect an odd start byte in latch M-3 in the odd path 404 and an even start byte in latch M-2 in the even path 402, indicating the even data lags the odd data by one clock cycle. However, in this instance, only three of the four even bytes will have reached the latches. Accordingly, the mux control logic 432 may delay one clock cycle (e.g., keeping the muxes disabled), allowing the fourth byte of even data to enter the even latch M before outputting the data from the muxes 434.

UTILIZING PACKET HISTORY

For some embodiments, the mux control logic 432 may compute and modify mux control signals on a per-packet basis. However, rather than modify mux control signals for every 8-bytes of data received, the mux control logic 432 may utilize the same (previous) mux control signals for 8-bytes of data that are not at the start of a (greater than 8-byte) packet. This may be useful in a number of situations, for example, if detectable start bytes are only available in the first 8-bytes of a packet or if it skew between paths is not likely to change within one packet.

Figure 5A:
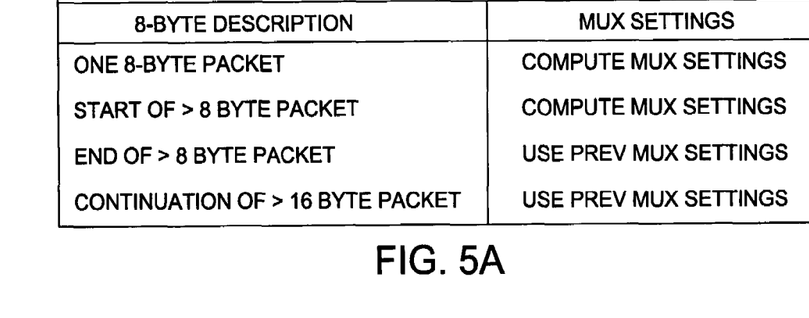
FIGS. 5A and 5B illustrate exemplary multiplexor select logic decisions for 8-byte and 16-byte packet aligners, respectively, based on packet history according to one embodiment of the present invention.

Table 5A illustrates the different parts of a packet a received 8 bytes may be and whether, for one embodiment, the mux control logic 432 computes new mux control signals or uses previously generated mux control signals. As illustrated, new mux signals may be computed if a received 8-bytes is a single 8-byte packet or the start of a packet that is greater than 8 bytes. On the other hand, if a received 8 bytes is at the end of a packet or in the middle of a packet that is greater than 16 bytes, previously generated mux control signals may be used.

As previously described with reference to FIG. 2B, a packet aligner, such as GPU packet aligner 135, may receive 16 bytes of data to be aligned and output. The principles described herein with respect to 8 byte alignment may be readily extended to align 16-byte of interleaved data. For example, a 16-byte packet aligner may utilize muliplexors with a greater number of outputs (e.g., 8 each) or using a greater number of multiplexors (4 each with 4 outputs). For some embodiments, each 8 bytes of 16 bytes of data may be a different part of a packet and may, in fact be in different packets. Accordingly, different multiplexor signals may be applied to properly align each.

Figure 5B:
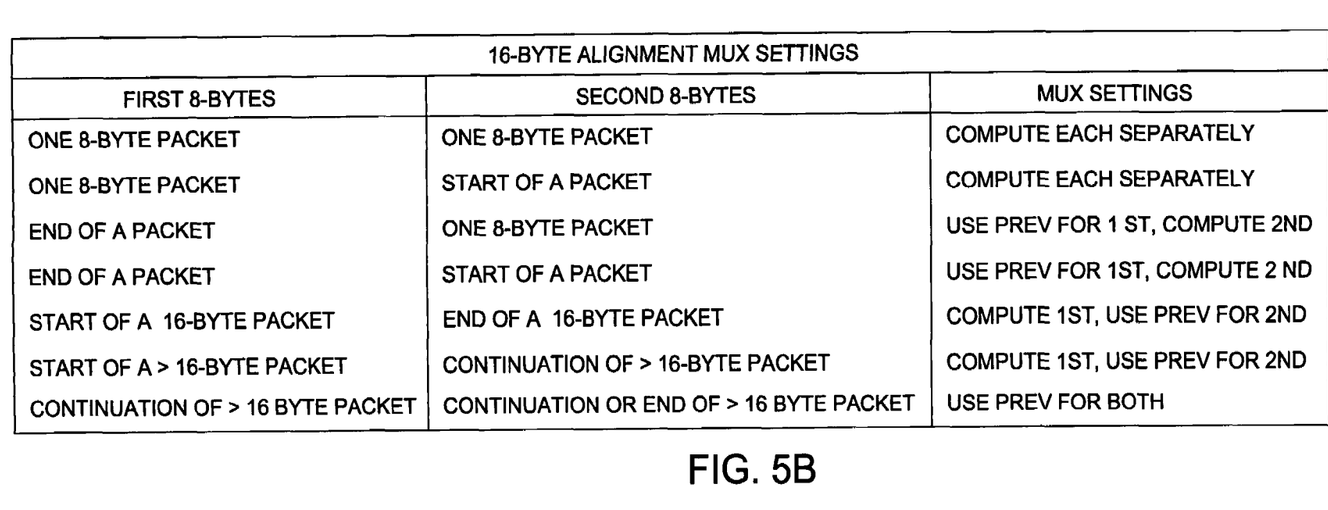

For example, as illustrated in FIG. 5B, if the first one of the 8 bytes is a single 8-byte packet, the second 8-bytes is either another 8-byte packet or the start of another packet larger than 8-bytes. In either case, the mux control signals may be computed separately for each of the 8-bytes. On the other hand, if the first 8-bytes is the end of a packet, previously computed mux control signals may be used, while the mux control signals for the second 8-bytes (either a single 8-byte packet or a start of a larger than 8-byte packet) may be computed. If the first 8-bytes is the start of a 16-byte packet or higher, the mux control signals for the first 8 bytes may be computed and used for the second 8 bytes (which is either the end of a 16-byte packet or a continuation of a packet that is greater than 16 bytes). Finally, if both 8bytes are a continuation of a greater than 16-byte packet (whether the second 8 bytes is in the middle or the end), previously computed mux control signals may be used for both 8 bytes.

CONCLUSION

By automatically aligning multi-path data, for example, on a packet-by-packet basis, embodiments of the present invention may be used to compensate for various factors that may change the alignment between the multiple paths over time. As a result, utilizing automatic packet alignment, as described herein, may allow for less expensive interface devices to be used, as well as more relaxed device wiring and/or layout constraints, all of which may lead to reduced costs.

While the foregoing is directed to embodiments of the present invention, other and further embodiments of the invention may be devised without departing from the basic scope thereof, and the scope thereof is determined by the claims that follow.

What is claimed is:

1. A method of aligning data received on at least first and second single-byte data paths, the data to be presented on a multi-byte interface, comprising:
    storing multiple bytes of data sequentially received on the first and second data paths;
    examining the contents of the stored bytes of data to detect misalignment between bytes of data received on the first data path and bytes of data received on the second data path; and
    in response to detecting misalignment between the bytes of data received on a first and second data paths, generating a plurality of control signals to properly align the bytes of data received on the first and second data paths and present the aligned bytes of data in parallel on the multi-byte interface.

2. The method of claim 1, wherein examining the contents of the stored bytes of data comprises determining if one or more bytes of data received on each of the first and second data path correspond to the start of a packet of data.

3. The method of claim 1, wherein determining if one or more bytes of data received on each of the first and second data path correspond to the start of a packet of data comprises examining a bit appended to each of the one or more bytes of data.

4. The method of claim 1, wherein storing multiple bytes of data sequentially received on the first and second data paths comprises:
    storing bytes of data sequentially received on the first data path in a first sequence of latches driven by a common clock signal; and
    storing bytes of data sequentially received on the second data path in a second sequence of latches driven by the common clock signal.

5. The method of claim 4, further comprising:
    coupling the contents of each of the first sequence of latches to a first multiplexor having outputs coupled to the multi-byte interface; and
    coupling the contents of each of the second sequence of latches to a second multiplexor having outputs coupled to the multi-byte interface.

6. The method of claim 5, wherein generating a plurality of control signals to properly align the bytes of data received on the first and second data paths and present the aligned bytes of data in parallel on the multi-byte interface comprises:
    generating a first set of control signals to control which latch contents are output to the multi-byte interface by the first multiplexor; and
    generating a second set of control signals to control which latch contents are output to the multi-byte interface by the second multiplexor.

7. The method of claim 1, comprising generating the plurality of control signals to properly align the bytes of data received on the first and second data paths and present the aligned bytes of data in parallel on the multi-byte interface at the earliest point possible after detecting misalignment and when all the data to be presented at the multi-byte interface is stored.

8. The method of claim 1, further comprising, after generating the plurality of control signals to properly align the bytes of data received on the first and second data paths and present the aligned bytes of data in parallel on the multi-byte interface:
    receiving additional data on the first and second data paths to be presented on the multi-byte interface;
    determining if the additional data is the start of a data packet; and
    if not, utilizing the previously generated control signals to properly align and output bytes of the additional data in parallel on the multi-byte interface.

9. A packet aligner for use in aligning bytes of data received on at least first and second single-byte data paths, the bytes of data to be presented on a multi-byte interface, comprising:
    a first series of latches for storing multiple bytes of data sequentially received on the first data path;
    a second series of latches for storing multiple bytes of data sequentially received on the second data path;
    one or more multiplexors for receiving the contents of the latches and presenting a subset of the contents of the latches on the multi-byte interface based on a plurality of control signals; and
    control circuitry configured to generate the plurality of control signals to properly align the bytes of data received on the first and second data paths based on the contents of the first and second series of latches.

10. The packet aligner of claim 9, wherein the first and second data paths are each 9 bits wide to carry 8 bits of data and one start bit.

11. The packet aligner of claim 9, wherein the multi-byte interface is 8 bytes wide.

12. The packet aligner of claim 9, wherein the multi-byte interface is at least 16 bytes wide.

13. The packet aligner of claim 9, wherein the one or more multiplexors comprises:
    a first multiplexor to selectively provide contents of the first series of latches as one half of the data on the multi-byte interface; and
    a second multiplexor to selectively provide contents of the second series of latches as the other half of the data presented on the multi-byte interface.

14. The packet aligner of claim 9, wherein the first and second series of latches are driven by a common clock signal.

15. A processor, comprising:
    one or more processor cores;
    a shared buffer for holding data transferred from or to be transferred to the one or more processor cores;
    a processor bus coupling the one or more processor cores and the shared buffer pool;
    a physical interface for receiving data from a device external to the processor via an external bus;
    first and second single-byte data paths for providing data from the physical interface to the processor bus; and
    a packet aligner configured to detect misalignment between bytes of data received over the first and second data paths and generate one or more control signals to align the bytes of data received over the first and second data paths and present the aligned data on a multi-byte interface between the packet aligner and the processor bus.

16. The processor of claim 15, wherein the packet aligner comprises:

a first series of latches for storing multiple bytes of data sequentially received on the first data path; and a second series of latches for storing multiple bytes of data sequentially received on the second data path.

17. The processor of claim 16, wherein the packet aligner further comprises:

one or more multiplexors for receiving the contents of the latches and presenting a subset on the multi-byte interface based on a plurality of control signals; and control circuitry configured to generate the plurality of control signals to properly align the bytes of data received on the first and second data paths based on the contents of the first and second series of latches.

18. The processor of claim 17, wherein the control circuitry is configured to detect, in both the first and second series of latches, byte contents indicative of bytes at the start of data packets.

19. The processor of claim 17, wherein the control circuitry is configured to detect, in both the first and second series of latches, bits appended to each byte of data received over the first and second data path, wherein the bits are indicative of whether a corresponding byte is at the start of a data packet.

20. The processor of claim 15, wherein the multi-byte interface is at least 16-bytes wide.

21. The processor of claim 15, wherein the processor is a graphics processing unit (GPU) and the processor cores are graphics processing cores.

* * * * *